MAGNETIC RECORDING AND REPRODUCING

Filed Sept. 12, 1947 6 Sheets-Sheet 1

INVENTOR
THOMAS E. LYNCH
BY Eber J. Hyde
ATTORNEY

July 14, 1953 T. E. LYNCH 2,645,682

MAGNETIC RECORDING AND REPRODUCING

Filed Sept. 12, 1947 6 Sheets-Sheet 2

INVENTOR.
T. E. LYNCH

BY [signature]

ATTORNEY

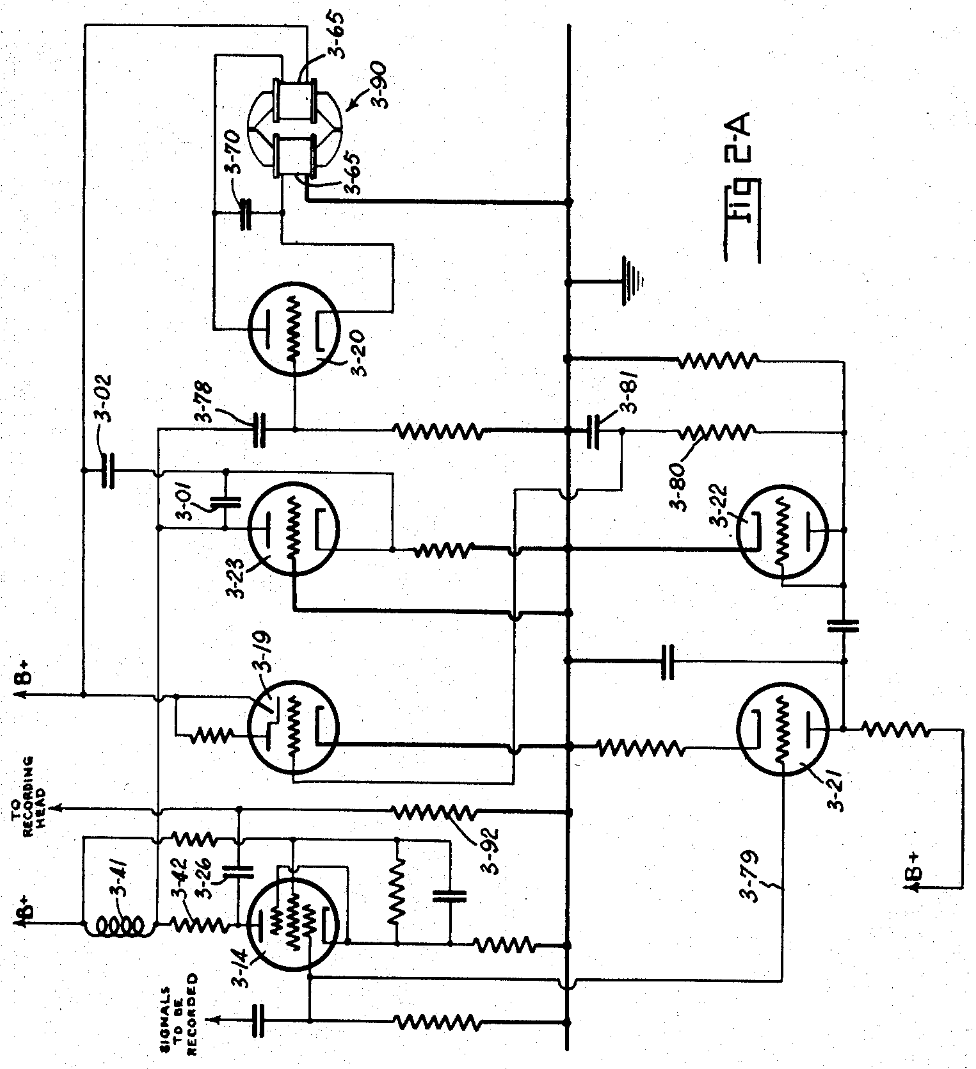
Fig 2-A
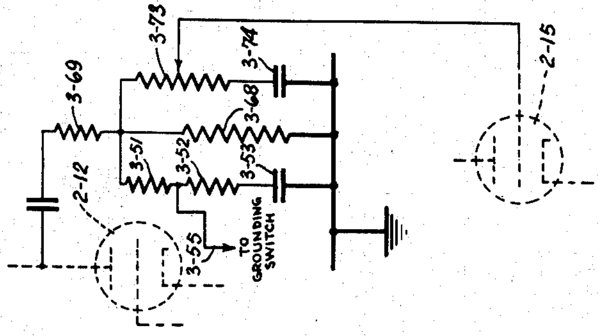
Fig 3-A
INVENTOR.
T. E. LYNCH
BY [signature]
ATTORNEY INVENTOR.
T. E. LYNCH
BY [signature]
ATTORNEY INVENTOR.
T. E. LYNCH
BY [signature]
ATTORNEY

INVENTOR.
THOMAS E. LYNCH
BY

ATTORNEY

Patented July 14, 1953 2,645,682

UNITED STATES PATENT OFFICE 2,645,682

MAGNETIC RECORDING AND REPRODUCING

Thomas E. Lynch, Cleveland, Ohio, assignor to The Brush Development Company, Cleveland, Ohio, a corporation of Ohio Application September 12, 1947, Serial No. 773,636

3 Claims. (Cl. 179—100.2)

This invention relates to magnetic transducing systems and more particularly to such systems including circuit arrangements for supplying the magnetic flux signals to be recorded on permanently magnetizable record members and for reproducing the record signals.

Among the objects of the invention are novel magnetic record transducing systems embodying circuit arrangements for effecting high quality magnetic recording and playback operations.

Other objects of the invention are novel magnetic record transducing systems of simple and compact construction yet fully capable of effecting the desired operation.

The foregoing and other objects of the invention will be best understood from the following description of exemplifications thereof, reference being had to the accompanying drawings, wherein.

Figure 2:
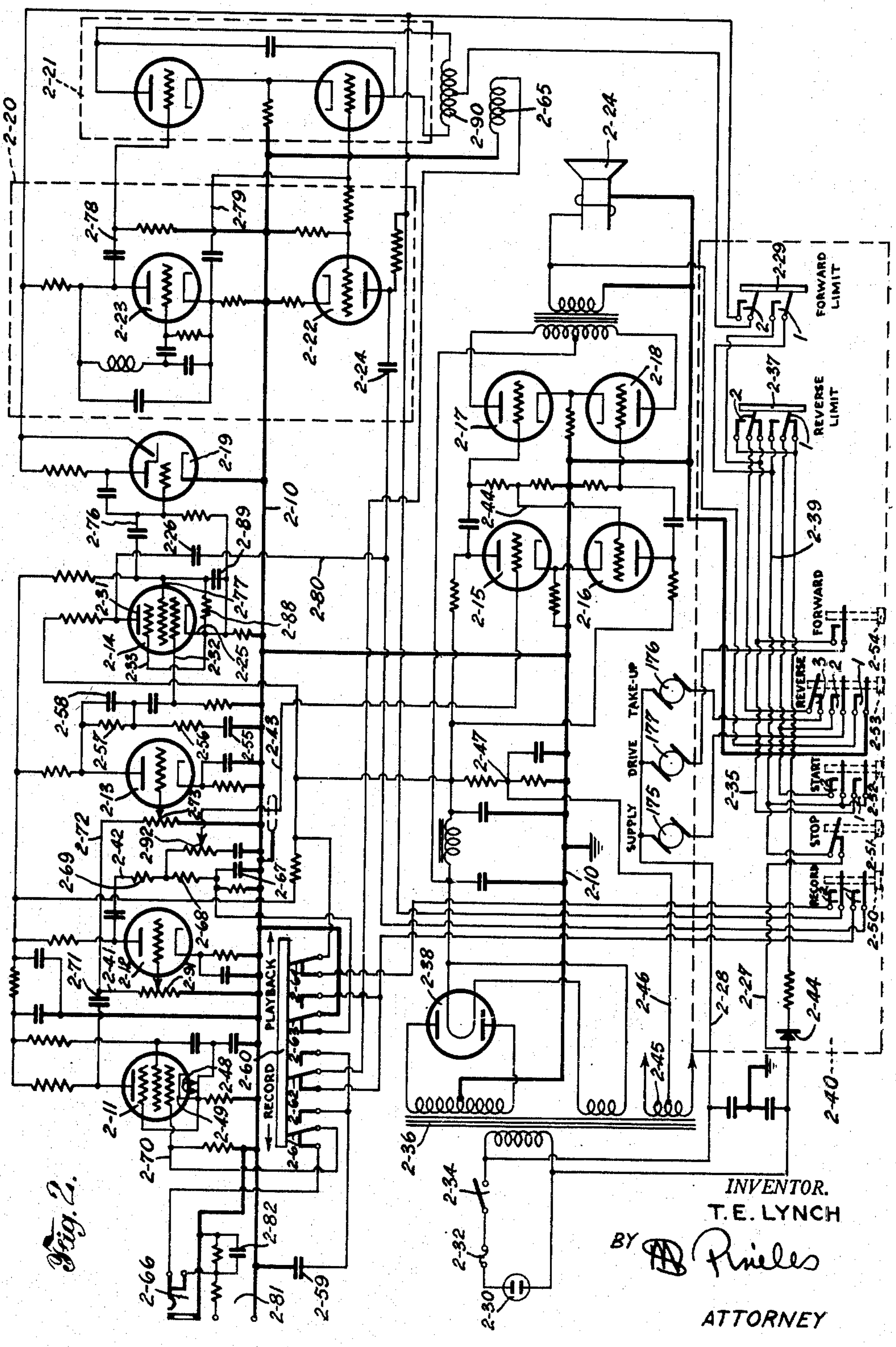
Fig. 2 is a detailed view of practical circuit arrangements of a magnetic record transducing system, such as that shown in Fig. 1.
Figure 3:
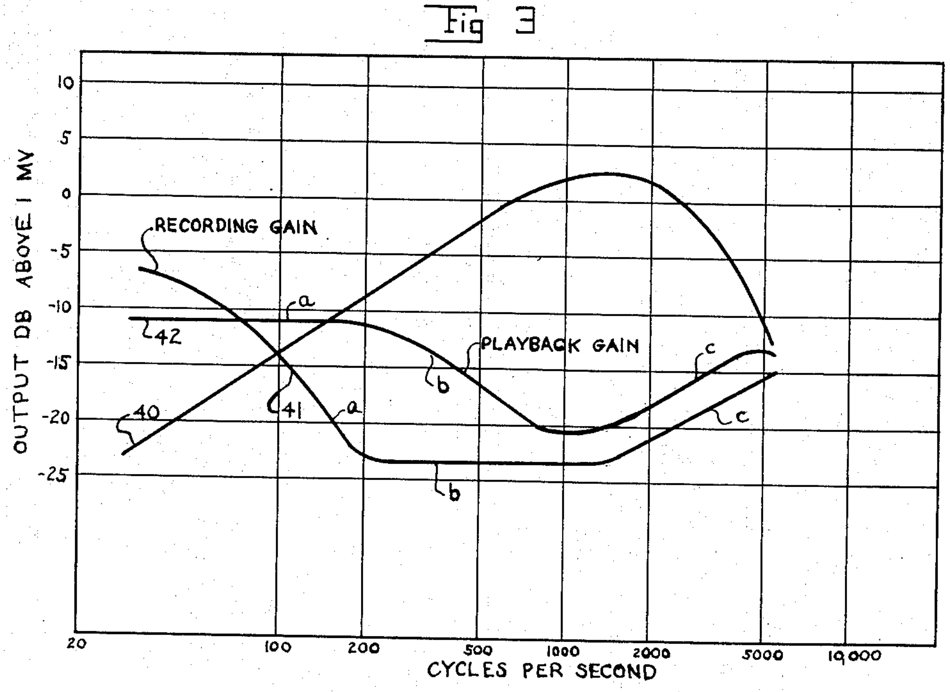
Figure 5:
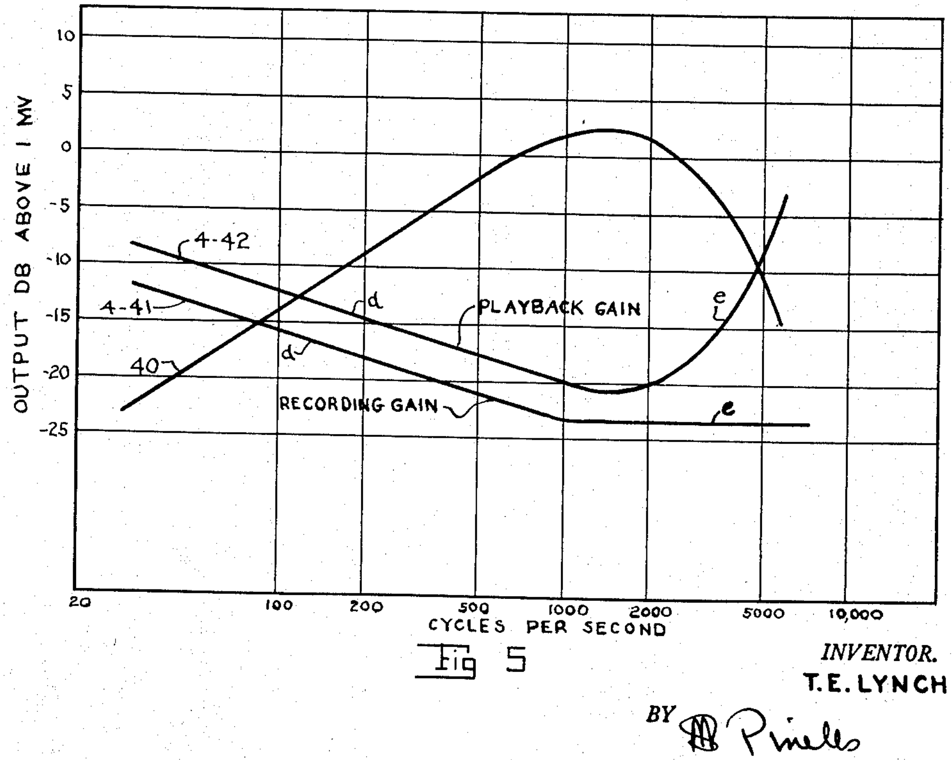
Figure 4:
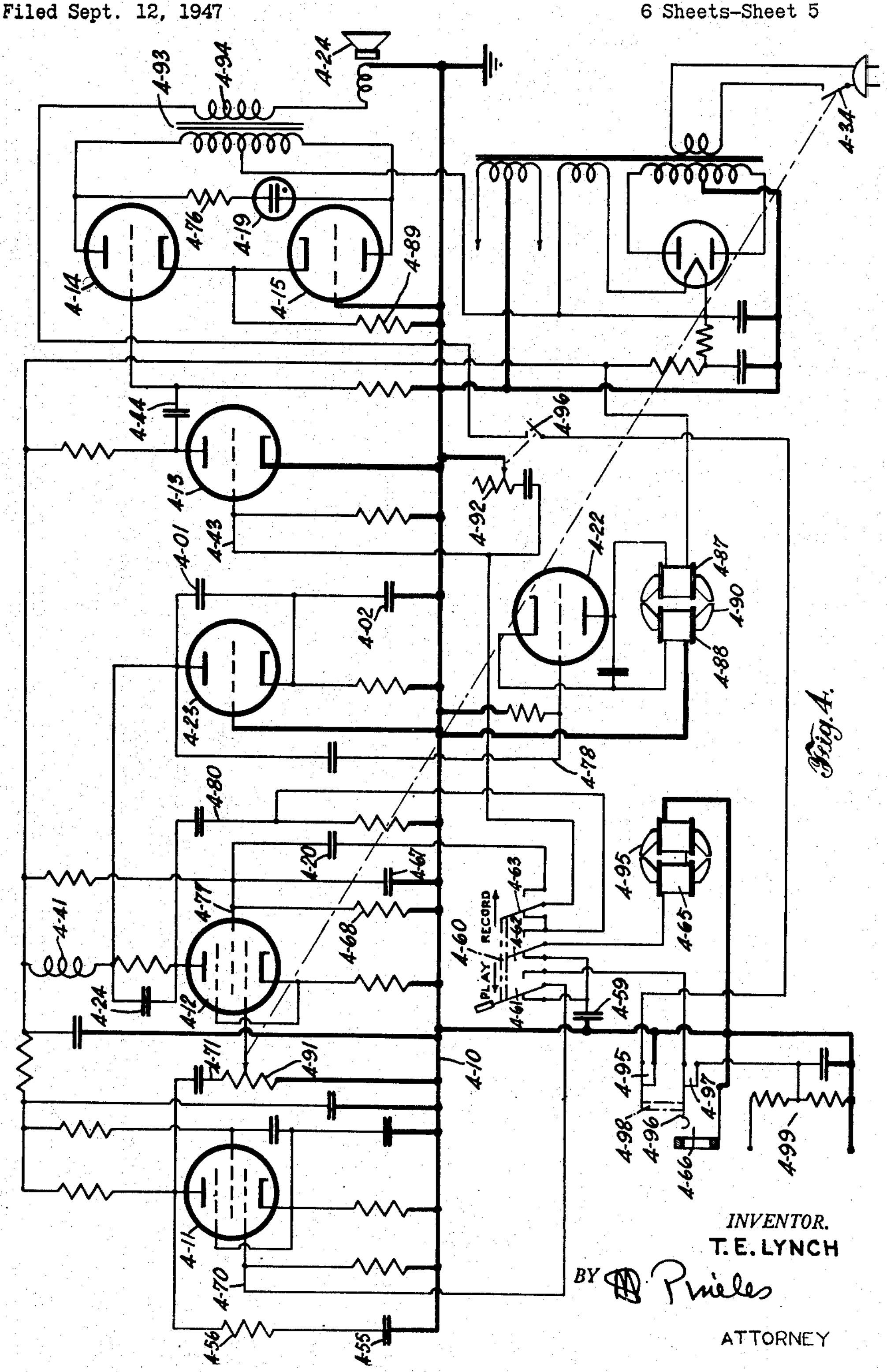

Fig. 2–A is a fragmentary view of a modified form of the magnetic record transducing system of Fig. 2;

Fig. 3 is a curve diagram indicating the operation of the equalizing features of the invention;

Fig. 3–A is a fragmentary view of a different embodiment of a portion of an equalizing system of the transducing system of Fig. 2;

Fig. 4 is a detailed view of a modified form of circuit arrangement similar to that shown in Fig. 2;

Fig. 5 is a curve diagram similar to Fig. 3 of another form of equalizing operation according to the invention; and Fig. 5–A is a curve diagram similar to a portion of Fig. 3 showing a portion of an equalization technique for the transducing arrangement of Fig. 4.

Figure 1:
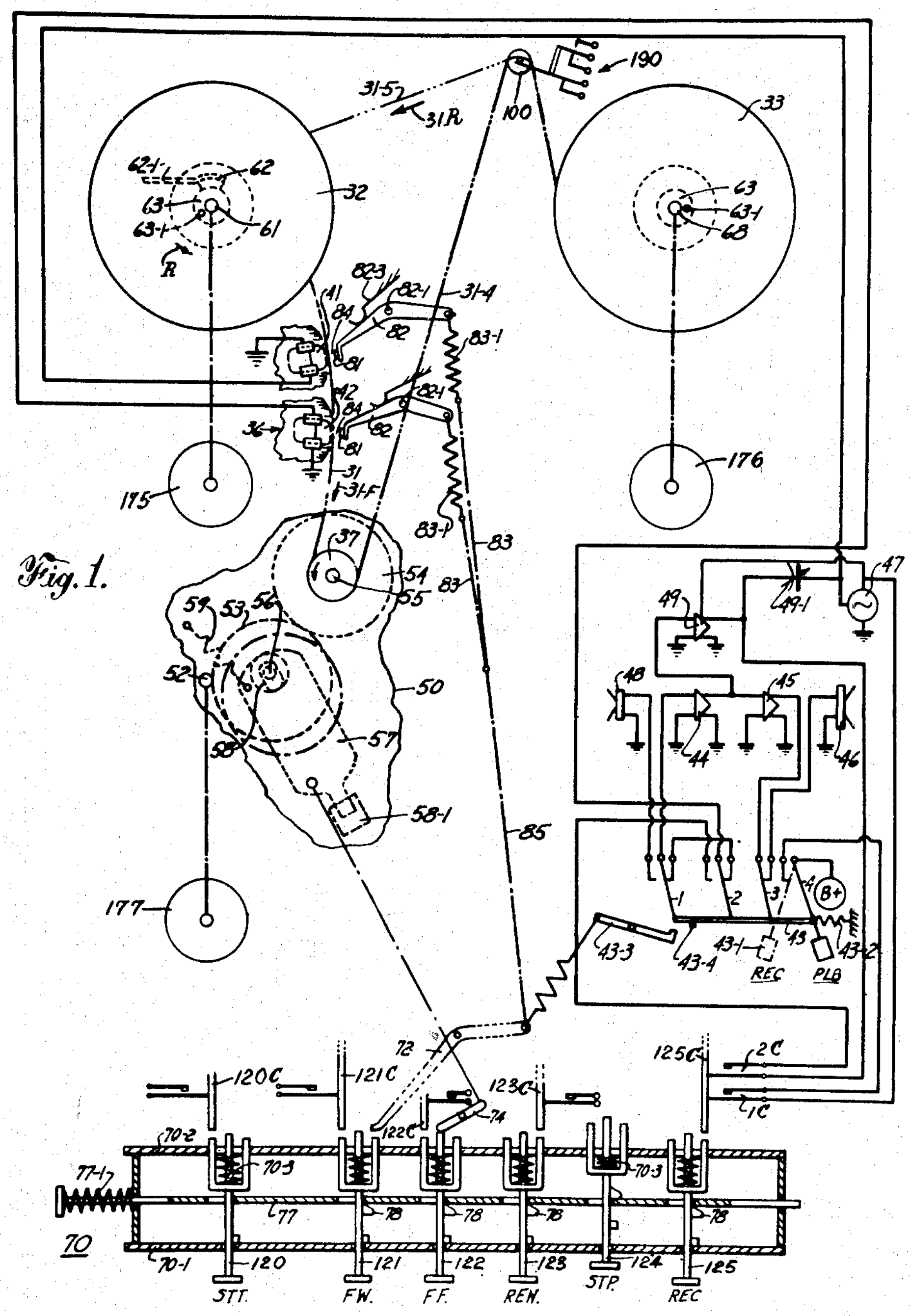
Fig. 1 is a simplified diagrammatic view illustrating the general relationship of the mechanical magnetic and electric elements of a magnetic record transducing system exemplifying the invention.

Fig. 1 illustrates in a simplified diagrammatic manner the general relationship of the mechanical, magnetic and electric elements of a form of a magnetic recording and reproducing apparatus of the invention designed specifically for use in connection with a recording medium formed of a thin limp elongated record member, such as a tape made of paper or a plastic or synthetic resin compound, provided at least one exposed surface with a layer containing a uniform dispersion of permanently magnetizable powder as disclosed in the copending Kornei application, Serial No. 685,092, filed July 20, 1946, now abandoned.

However, the features of the invention disclosed herein are applicable to other magnetic recording media, such as thin filaments, of fibre or filament forming linear polymers embodying or coated with a layer of magnetizable particles or metallic ferro-magnetic tapes, filaments and wires.

In Fig. 1 the magnetic recording medium is indicated by dash-double-dot line 31, and is arranged to be reeled from supply reel 32 onto take-up reel 33. The supply reel 32 and the take-up reel 33 are mounted on reel shafts 34 and 35, respectively, which are driven by reel drive mechanism so that during the recording and the playback processes the recording medium 31 is impelled in the direction of the arrow 31–F, and reeled from supply reel 32 onto the take-up reel 33. In order to play back the recorded program or to make a new record on the recording medium, it must be rewound or reeled from take-up reel 33 onto supply reel 32.

To simplify the description of the features of the invention, a slow speed reeling operation in the direction of the arrow 31–F, during which a new record is made on the recording medium or a previously made record is played back, will be designated a forward reeling operation, reel 32 will be designated the supply reel and reel 33, the take-up reel. In addition, the fast rewinding operation during which the recording medium is reeled back from the take-up reel 33 on the supply reel 32 in the direction indicated by the arrow 31–R will be designated as the rewind operation, and a fast reeling operation in the forward direction indicated by the arrow 31–F, in order to quickly reach a desired point on the recording medium for playing back a record sequence made thereon or for replacing it with another record sequence, will be designated as the fast forward reeling operation.

In the particular form of recording apparatus shown, the take-up reel is driven in counter-clockwise direction during a forward reeling operation, and the supply reel 32 is similarly driven in counter-clockwise direction as indicated by the arrow R during the rewinding operation. The reels 32, 33 are similar to those used for standard amateur-type motion picture reels. Thus, in the case of a recording medium formed of a thin tape one-quarter of an inch wide, each reel may be made with an inner reel core 1⅜ inches in diameter so that a reel seven inches in diameter is sufficient for storing a length of the recording medium required to make a record of one-half hour duration. The reels described in the copending Murphy application Serial No. 741,620, filed April 15, 1947, are especially suitable.

During the recording or playback process the recording medium 31 is guided from the supply reel 32 past a record transducer head structure 36, along a forward drive path indicated by the dash-double-dot line 31—4, so as to couplingly engage the periphery of a capstan-like roller 37 and pass therefrom along the guide surface of a limit control member 100 to the take-up reel 33. During the rewinding process, the recording medium 31 may be guided along the same path just described, as it is reeled from the take-up reel 33 onto the supply reel 32. However, it is simpler to remove the record tape 31 from the capstan roller and carry on the rewinding process by guiding the tape 31 directly back from the take-up reel 33 onto the supply reel 32, along the fast reeling or rewind path indicated by the dash-triple-dot line 31—5, the tape being guided along the guide surface of a limit control member 100. This fast reeling path 31—5 may also be utilized whenever it is desired to reel the record member fast in forward direction on the take-up reel, for instance, in order to quickly reach a desired portion of a long record.

The limit control member is combined with limit switches 190 which are actuated from a non-operated position to the operated position shown when the limit control member is operated by the recording medium 31.

The magnetic head structure 36 is not part of the present invention and may be of the type described in the copending Begun application Serial No. 688,738, filed August 6, 1946, which issued as Patent No. 2,513,617, on July 4, 1950, and the application of Otto Kornei, Serial No. 688,034, filed August 2, 1946, which issued as Patent No. 2,523,576, on September 26, 1950. The transducer head structure 36 shown has an erasing head 41 and a record transducing head 42 each provided with windings and a magnetic core structure which has pole pieces separated by a non-magnetic gap along which the recording medium is moving in the direction of the arrow 31-F during a magnetic recording or playback process.

During the magnetic recording process, each element of the recording medium 31 passes successively first past the gap region of the erasing head 41 and then past the gap region of the recording head 42. The recording system shown in Fig. 1 is arranged to carry on magnetic recording and reproducing operations under the control of a multi-blade recording switch 43 which controls the electric circuit connections of the recording head structure with the amplifier and signal pickup and reproducing devices of the system, additional control means, generally designated 70, serving to provide for the proper operation of the driving mechanism during the recording, playback and other reeling operations.

The recording switch 43 is a standard multi-blade switch shown operated manually by a knob between the full-line right-hand playback position shown and the left-hand dotted-line recording position 43—1. The drive control unit 70 is indicated in Fig. 1 diagrammatically as a conventional push-button type selector control arrangement provided with a series of button-operated push rods 120, 121, 122, 123, 124 and 125, also designated by the legends STRT for start, FW for forward, FF for fast forward, REW for rewind, STP for stop, and REC for record.

In such conventional push-rod selector control mechanism, a slidably mounted latch bar 77, which is biased to a latching position as by a spring 77—1, is arranged to retain in an inward operative position one or more of the previously actuated push rods, such as push rod 75 shown latched in the inward position, the latch bar 77 being actuated to release the latched push rod whenever it is actuated in lateral direction against the biasing action of spring 77—1 by a cam surface of a latch projection 78 shown provided on the push rods 120 to 125 which are to be latched when selectively actuated to an inward position.

The latch bar and the mounting structure elements 70—1, 70—2 of the push-rod mechanism are provided with suitable slits through which the several push rods are arranged to be slidably movable between the inward operative position and the released outward position to which they are biased by the springs 70—3 encircling a prong portion of each push rod. The substantially rigid frame structure of such push rod mechanism may be also utilized to support sets of control switches 120C, 121C, 122C, 123C and 125C as indicated in Fig. 1 so that whenever any one of the push rods is pushed to the inward operated position, it will actuate its switch set to the operated position.

It will be noted that the push rod 120 of the starting switch rod is not provided with a latch projection 78 so that when it is actuated to the inward operated position, it and its switch set 120C are automatically returned to the non-operated position. Furthermore, since the push rod 120 of the starting switch does not have a latch projection 78, it does not release any of the other push rods from an inward operated position to which they may have been actuated before actuation of the starting switch push rod 120.

In addition, as indicated diagrammatically in Fig. 1, the framework of the push-rod mechanism 70 has mounted thereon mechanical elements, such as pivotally mounted levers 72 and 74 which are arranged so that whenever the respective push rods 121, 122 are actuated to the inward operated position, the respective levers 72, 74 are actuated from the non-operated position shown to an operated position for performing a desired mechanical control operation, as explained hereinafter. Although the push-rod selector control arrangement is shown in Fig. 1 for controlling the operation of the switches and mechanical control elements of the reeling mechanism, other types of analogous control arrangements may be used, for instance, a rotary type selector control arrangement movable to a plurality of different angular positions and provided with cam elements for selectively actuating the different switches and the different mechanical control elements in the different settings of the rotary control member.

With the control arrangement of Fig. 1 as shown, a record recorded on the recording medium 31 will be played back when the main recording switch 43 is in the full-line position shown while the recording track 31 is reeled on the take-up reel 33. In such playback condition, the recording switch 43 establishes the following playback circuits:

Contacts 1 and 2 of the recording switch 43 connect the lead from the windings of the recording head 42 which now operates as a playback head to the input side of a pre-amplifier 44, the output of which is impressed on an additional playback amplifier 45, the output side of which is connected through switch blade 3 of the recording switch 43 in its playback position to the reproducing device shown in the form of a loudspeaker 46.

In order to make a new record on a portion of the moving recording medium 31 when the sets of switches 121C and 125C are operated by the push-button rods 121 and 125 in the manner explained hereinafter, the recording switch 43 has to be thrown to the left-hand dotted-line position 43—1 in which it establishes in connection with the other operated switches of the device the following recording circuit:

Contact blade 4 of the recording switch 43 in its left-hand position, in conjunction with contact 1C of push rod switch 125C connects a source of high frequency oscillations, such as an oscillator 47 to a source of positive electric power supply indicated by (B+). The oscillator circuit as well as the other analogous circuits described hereinafter, are shown completed by conventionally indicated ground connections to which are also connected the negative terminals of all D. C. supply sources. High frequency oscillator 47 is shown connected directly to the windings of the erasing head 41.

The high frequency erasing current supplied by the oscillator 47 to the windings of the erasing head 41 is of sufficiently large amplitude so that each element of the thin magnetic recording medium 31 passing the gap region of the erasing head 41 is subjected to an alternating flux strong enough to erase any previous magnetic signal record impressed on the moving magnetic recording medium 31 and restore the magnetic elements thereof to a magnetically neutral condition.

After being subjected to the magnetic erasing action by the erasing head, each element of the moving recording medium 31, upon reaching the gap region of the recording head 42, is subjected to the combined action of a magnetic recording flux produced by the amplified signal currents that are to be recorded and the superposed high frequency biasing flux component. In Fig. 1, a conventionally shown microphone 48 serves as a source of signals which are to be recorded, and blade 1 of the recording switch 43 in its left-hand recording position connects the microphone 48 to the input side of the pre-amplifier 44, the output of which is impressed on an additional recording amplifier stage 49, the output of which is supplied to the windings of the recording head 42 by a circuit including the operated contacts 2-C of the push rod switch 125-C and the contacts of the contact blade 2 of the recording switch 43 in the left-hand recording position, the circuit being completed by the ground connections shown.

The high frequency bias component of the recording flux is produced in the recording head 42 by a high frequency current component derived from the oscillator 47 through an adjustable coupling condenser 49—1, the high frequency component of the current being mixed with the amplified output of the recording amplifier 49 and supplied to the windings of the recording head 42 through the previously described circuit connection. Coupling condenser 49—1 and the other circuit elements of the system are designed and adjusted to mix a suitable component of the high frequency oscillations produced by the oscillator 47 with the amplified signal current supplied by the signal source, such as microphone 48 in such manner as to produce in the non-magnetic gap region of the recording head 42 the desired combination of signal recording flux and the superposed high frequency biasing flux component.

In general, when recording signals of the audible frequency range, good results are obtained by using a high frequency biasing flux of about 25 to 30 kilocycles per second, and the same source of high-frequency oscillations may be used in supplying the relatively large high-frequency erasing current to the erasing head 41, as well as the relatively small high-frequency biasing component to the recording head 42.

As indicated, the additional amplifier 49 is arranged to be supplied with its anode potential through the same circuit which supplies the positive B potential to the oscillator 47, so that the recording amplifier 49 is rendered operative only when the recording switch 43 is in the left-hand recording position.

According to the invention, the driving elements which impart driving forces to the recording medium 31 and cause it to be reeled from one reel to the other are interconnected to the elements which impel the reels by yieldable coupling means which subject the thin flexible recording medium at all times only to very limited forces just sufficient to take up its slack, but insufficient to maintain stable contact conditions between the pole faces of the recording and erasing heads 42, 41 and the elements of the recording medium moving past it.

Fig. 1 indicates diagrammatically one simple form of a driving arrangement based on the principles of the invention. During the recording or playback operation or during the normal forward reeling operation, the recording medium 31 is impelled at a constant speed past the two heads 41, 42 through its engagement with the capstan roller 37 forming part of constant speed impelling means. The constant speed impelling means include an electric motor 177 having a shaft 52 which is coupled through a rubber-tired floating coupling pulley 53 to the rim of a flywheel member 54 to which the constant speed impelling roller or capstan 37 is connected, the capstan roller 37 and the fly wheel 54 having a common shaft 55 serving as their revolving support.

In order to prevent the recording medium, such as the tape or filament 31, withdrawn from the supply reel 32 from becoming slack, and in order to assure that it moves at all times under a small limited force, a shaft 61 on which the supply reel 32 is mounted may be subjected to a limited braking action exerted, for instance, by a braking pad 62 supported by a resilient brake arm 62—1 and engaging the surface of a collar or disc 63 affixed to the shaft 61 and which is shown serving as the coupling seat on which the supply reel 32 is seated.

In the specific drive arrangement shown, the shaft 61 forms a revolving part of an electric motor 175 suitably supported on the frame structure of the reeling mechanism underneath a mounting panel so as to expose through a hole in the top of the panel the seating member 63 of the shaft. The seating member or collar 63 affixed to the shaft just below its upwardly projecting end may be provided with an upwardly projecting coupling or key pin 63—1 arranged to interfit with a coupling notch extending from the central hole formed on the hub of each reel 32, 33 so as to establish a coupling connection between the shaft 61 and a reel, such as reel 32, seated on the seating collar 63. Alternatively, each reel support shaft may be provided with a transversely extending key arranged to interfit with coupling notches extending from the central hole formed in the hub of the reel.

In one commercial form of a recording mechanism of the type shown in Fig. 1, each of the reels 32, 33 is designed to revolve around a vertical axis.

Reel 33 is similarly supported on a similar seating disc 63 of another reel drive shaft 68 which in the arrangement shown in Fig. 1 forms a revolving part of another electric motor 176 supported underneath the top panel in the same manner as the elements of the motor 175 which serves as a revolvable support for the reel 32. Through the medium of the three electric motors the driving shaft of the supply reel 32 and the take-up reel 33 are intercoupled with the drive mechanism of the constant speed normal forward drive capstan 37.

As indicated in Fig. 1, the capstan roller 37 with its fly wheel 54 may be mounted to revolve on the shaft 55 which is held affixed to a mounting plate 50 which is secured, for instance, through a plurality of spacer rods, not shown, to the underside of the panel wall along which the reels and the other exposed elements of the driving mechanism are located in exposed positions. The motor 177 is suitably affixed to the underside of the mounting plate 50 so that the exposed upper shaft end of the motor shaft 52 projects through a hole in the mounting plate and faces a peripheral portion of the rubber-tired coupling pulley 53 through which the shaft is coupled to the metallic periphery of the fly wheel 54. The floating coupling pulley 53 is mounted in a manner similar to the conventional mountings of the floating coupling pulleys in phonograph drives.

As indicated, the coupling pulley 53 is rotatably mounted on a shaft post 56 held affixed to a plate-like slider member 57. The slider plate 57 is slidingly interconnected in a conventional way with apertures 58, 58—1 of the motor mounting plate 50 and is biased, as by a tension spring 59, connected between a fixed portion of the slider 57 and a fixed portion of the mounting plate 50, so as to maintain the rubber tire of the coupling pulley 53 in coupling engagement with a motor shaft 52 and the fly wheel 54 for transmitting thereto and to the capstan 37 a rotary motion which causes the capstan roller 53 to impart to the recording medium or tape 31 the required flutter-free low constant speed, the rubber-tired coupling pulley with the fly wheel 54 serving as a filter for filtering out any non-uniformities of the motion transmitted by the motor 177.

In a commercial embodiment of the driving mechanism of the construction shown in Fig. 1, the three motors are high-speed induction motors similar to the type commonly used in small turntable drives. The motors however may be of a relatively higher torque to enable suitable driving of a reel full of tape. In this driving arrangement, the shafts of the two motors 175, 176 form revolvable supports for the two reels 32, 33 and the bearings of these motors serve as journalling supports for the shafts 61, 68 of the two reels.

The surface of the capstan roller 37 is provided with a surface layer of friction material, such as a resinous layer containing powdered filler, or cork or felt. When the magnetic recording medium 31 is made in the form of a tape of non-magnetic material, such as paper or plastic or resin material, an impelling or capstan roller, ⅞ of an inch in diameter, will establish a good coupling driving engagement with such tape for driving it at a constant speed if the tape encircles about ⅓ of the periphery of such impelling roller.

The driving arrangement for the recording medium may be so designed so that when the magnetic recording medium, such as the flexible thin tape 31 of limited strength is impelled along the normal path 31–F at a slow speed by the driving forces imparted thereto by the capstan roller 37, the portion of the tape moving from the supply reel 32 past the erasing and recording heads 41, 42 to its position of engagement with the capstan roller 37 is subjected to such small tension forces that they are insufficient by themselves to maintain stable coupling engagement between the pole faces of the two magnetic heads 41, 42 and the facing portions of the moving tape 31 bridging the pole gaps of the two heads.

Stable contact conditions between the pole faces of each magnetic head 41, 42 and the portions of the moving recording medium 31 bridging the pole gap are assured notwithstanding the limited small tension forces to which the moving recording medium is subjected, by placing in front of the pole gap of each of the two magnetic heads 41, 42 a holder or pressure pad 81 arranged so that when a recording or playback operation is carried on the holder pad 81 engages the exterior side of the tape and maintains or presses the inwardly facing side of the tape along which the magnetic recording medium is exposed into positive contact engagement with the pole faces of each magnetic head bridging the pole gap region to assure stable flux interlinkage between the windings of each magnetic head and the magnetic particles of the recording medium bridging the gap.

Each of the holder pads 81 may be mounted on a separate lever arm 82 pivotally mounted at 82—1 and subjected to a biasing action as by a spring 82—3 so that when each lever is subjected to actuating forces exerted thereon by links 83, respectively, the two levers are actuated to bring their respective holder pads 81 into engagement with the outwardly facing side of the portions of the moving tape 31 facing the pole faces of the two magnetic heads 41, 42 to assure positive and stable contact engagement between the pole faces of the two heads and the magnetic particles of the moving recording medium, notwithstanding the small tension forces to which the moving recording medium is subjected.

As indicated in Fig. 1, each of the holder pads 81 is normally held by the biasing means 82—3 away from the facing pole faces of their respective magnetic heads 41, 42 so as to leave open a substantial channel space 84 between each pad and the facing magnetic head for enabling ready placing or threading the tape or, in general, the recording medium 31 along the path of the normal forward reeling motion 31–F as well as ready removal or unthreading of the tape.

In other words, under normal conditions when no normal forward reeling operation is carried on, the entire forward reeling path 31–F along which the recording medium or tape is guided from the supply reel past the transducer heads and the capstan roller 37 to the take-up reel is open and forms a free, relatively-wide channel into which the tape may be placed or from which it may be removed. However, as indicated diagrammatically in Fig. 1, each time the drive control mechanism is actuated to bring into action a normal forward reeling operation by actuating, for instance, the forward push rod 121 to the inward position, it will operate the lever 72 to exert through a link 85 connecting it to the two links leading from the two pad levers 82 associated with the two magnetic heads, for causing the two pads 81 to be brought to their operated position in which each pad holds a portion of the tape in positive stable coupling engagement with the facing portion of the respective magnetic heads 41, 42.

Foolproof operation of this mechanism is made possible by interposing in each of the two links 83 through which the control lever 72 is connected to the two pad operating levers 82 a spring 83—1 so designed that when the two links 83 are actuated by the actuation of the control lever 72 to the operated position, the two springs 83—1 will be subjected to sufficient tension for overcoming the biasing forces exerted by the two biasing springs 82—3 associated with each pad lever and cause the two levers 82 to be operated for bringing their respective pressure pads 81 into the proper contact engagement position in which they hold portions of the tape in positive stable engagement with the facing pole faces of the two magnetic heads.

In a practical form of recording mechanism of the type shown diagrammatically in Fig. 1, each end of the recording medium 31 made in the form of a thin flexible tape of the type described above may be connected to the inner core or drum 34 of each reel by inserting the end of the tape into an axially directed slit formed in the reel core wall and then turning the reel until one convolution of the tape retains the inserted tape end in its position on the exterior of the core, at least one side wall of each reel being provided with a generally radial opening or slit so as to make it possible to grip the end of the tape brought against the open periphery of the reel and place the gripped end of the tape in the slit of the reel core 34.

When carrying on reeling operations with such reel and tape arrangement, the end of the tape will automatically be pulled out from the reel from which it is unreeled when the full length of the tape has been transferred to the reel on which it is reeled.

The reel drive mechanism may be arranged to assure that the driving forces for impelling the tape from one reel to the other subject the tape to an initial tensioning force sufficient to move a limit control member, such as limit member 100 from a non-operated position to the operated position shown in which they perform a control action establishing the reel impelling conditions under which the impelling drive connections are maintained to continue the reeling operation until either the drive control arrangement has been stopped by the actuation of a stop control member or until the whole length of the recording medium or tape has been transported from one reel to the other.

The controls may also be arranged to automatically apply a braking action to either reel to stop its rotation at the end of an impelling operation. As shown in the copending Begun application Serial No. 723,735, filed January 23, 1947, now Patent No. 2,622,811 which issued on December 23, 1952, the braking action may be supplied by passing direct current through the reel motor to be braked and may also be arranged to automatically select the reel to be braked after a high speed reeling dependent upon whether or not the record track is completely unreeled. The rotational inertia of a rapidly moving reel makes it advisable to brake the reel from which record track is still unreeling at high speed to prevent throwing of record track, and to brake the other reel when the high speed unreeling is completed to prevent whipping of the free end of the record track. At low speeds the braking action is not needed.

As indicated above the reeling motors may be of the low power constant speed type. The constant speed feature enables the direct and simple driving of the capstan 37, whereas the low power permits suitable forward reeling with a direct connection between the take-up motor 176 and the take-up reel 33. Although the effective diameter on which the record track is wound on the take-up reel 32 varies as the amount of wound record track on this reel changes, the take-up motor 176 does not control the linear speed of the record track, but merely acts to take-up the slack between the capstan 37 and the take-up reel. The frictional engagement between about one-half turn of the record track and the capstan roller 37 insures the forward reeling at the desired constant speed. The poor leverage of the take-up motor 176 acting along the relatively large effective diameter of the take-up winding permits the record track feed of the capstan to control the rotation of this motor. The take-up motor 176 should be so selected as to provide the required R. P. M. for take-up at the desired forward reeling speed with the minimum and maximum effective diameters of the take-up winding.

The impelling of the record track with less than one turn of record track contacting the friction facing of the capstan roller provides a simple constant speed reeling arrangement which does not require complicated threading or anchoring of the record track.

Under some conditions it may be desired to rapidly reel the record track in the forward direction to reach some desired portion containing a selected recording. In the arrangement shown in Fig. 1 the record track may be placed in the dash-triple-dot guide path 35—5 so that it is wound on take-up reel 33 without contacting the capstan roller 37 or transducing unit 36. As so arranged a record track which requires thirty (30) minutes for complete reeling at a slow forward speed may, for example, be completely reeled at high speed in times as short as one minute. The rewind reeling may also be effected at the same high speed.

Fig. 2 shows the details of a practical form of amplifying structure of the magnetic transducer apparatus of the invention together with control elements for suitably operating it. The amplifying structures shown include a plurality of signal amplification stages identified by the amplifying tubes 2—11 through 2—18 arranged to be connected for amplifying signals to be recorded as well as signals being reproduced. A biasing assembly, generally indicated at 2—20, is also provided for supplying high frequency currents as described above for mixing with the signals to be recorded. These mixed signals so effect the successive elements of the magnetic record track that they become permanently magnetized according to the successive values of the signal currents. The bias currents greatly diminish the distortion otherwise introduced by the pronounced knee that the magnetization curve of the magnetic record track elements exhibit at the zero point by, in effect, collapsing the hysteresis loop of these elements to give a biased magnetization characteristic having a substantially straight line region at the zero point.

Energization of the amplifier and bias structures is provided by an energy source shown as including a plug 2—30 for inserting in a conventional alternating current power line socket and providing filament and B+ power through fuse 2—32, On-Off switch 2—34, power transformer 2—36 and rectifier 2—38. Operating controls indicated as the unit 2—40 are of a modified form of construction including two separate limit controls 2—29 and 2—37 operated in conjunction with a simplified group of push buttons 2—50 to 2—54 for controlling the energizations of the supply take-up and capstan motors 175, 176 and 177, respectively. A transducing control in the form of a multiblade switch 2—60 may be incorporated with the control unit 2—40 for connecting the amplifying and biasing circuits to supply signals to the windings of the transducer core 2—65 for recording, or to amplify signals induced in the transducing core for reproducing.

The operation of the form of invention shown in Fig. 2 is as follows:

For recording signals, a jack 2—66 may receive a microphone plug and transmit microphone signals through a blade 2—61 of the transducing control switch to the input 2—70 of amplifying stage 2—11. From the output 2—71 of this stage, the amplified signal is further amplified by passage through amplifying stages 2—13 and 2—14, the final output circuit of which, as shown at 2—80, is connected to the transducer core windings 2—65 through contacts 1 of push button switch 2—50 and blade 2—62 of transducing control switch 2—60. The circuits are completed by a common ground 2—10. The input heads to the preliminary amplifier 2—11 may be in the form of a twisted pair of wires, one connected to the tube grid and the other to ground. Such twisting is effective for cancellation of any interfering signals that may have a tendency to be induced in the high impedance low level circuit because of the pressure of external fields such as the hum of the 60 cycle power lines.

In the form shown, the input 2—72 of amplifying stage 2—13 may incorporate a recording volume control 2—73. An intensity inductor shown as electron ray tube 2—19 may be arranged to provide a visual indication of the comparative level of the amplified signals being recorded so as to enable proper operation with the recording currents adjusted within a satisfactory operating range. For example, an electron ray tube may be connected to provide a segmental shadow in an annular screen fluorescing under the action of impinging electrons, and the shadow may be arranged to contract and expand with the oscillations of the amplified signal currents. When these currents are high enough to generate a recording flux in the playback core above the limits at which the elements of the record track faithfully record the flux, the tuning-eye shadow may be arranged to completely contract and vanish. Whereas, for signal currents too low to be effectively recorded and reproduced, the shadow may be arranged to have imperceptible contractions so that it appears to be motionless.

According to the invention, the final recording amplifier stage 2—14 has as its amplifying element a vacuum tube of the screen grid type, and the intensity indicator 2—19 may have its input 2—76 fed by the screen grid 2—77 of this tube.

The recording volume control 2—73 may be adjusted in accordance with the indications of the intensity level indicator 2—19 so as to maintain the recordings within the effective range. Best results are obtained by adjusting the recording intensity to the maximum regions of the effective range.

During the recording, the biasing unit 2—20 is operated to provide bias currents superimposed on the signal currents and fed to the transducing windings 2—65. In the form shown in Fig. 2, the bias assembly includes a vacuum tube oscillator stage 2—23 providing a plurality of output circuits. The vacuum tube of stage 2—23 is shown as a tripode having a plate output 2—78 and a cathode output 2—79 in opposite phase for further amplification by the two tube push-pull amplifying stage 2—21. One of the oscillator tubes is also connected to the bias amplifying stage 2—22.

According to the invention, the final bias output is taken directly from the plate of vacuum tube amplifier 2—22 through a by-passing condenser 2—24 to the transducing windings 2—65. The signal output is also taken directly from the plate of vacuum tube amplifier 2—14 through a by-passing condenser 2—26 and to the transducing windings.

A feature of the invention is the fact that the final screen-grid amplifier, from which signal currents are directly taken to the transducer windings, has substantially unvarying operation in spite of the relatively large changes in the output impedance of the transducer windings with variations in signal frequencies. The screen-grid tube of final signal amplifying stage 2—14 may be of a convention type including an electron source 2—25 in the form of a heated cathode for emitting electrons, and an electron collector 2—31 in the form of a plate charged to a positive potential with respect to the cathode 2—25 for collecting the emitted electrons and establishing a main circuit path for these electrons. The tube also includes a control electrode 2—32 which is connected to a source of signals to be amplified, and modulates the flow of electrons passing from the cathode 2—15 to the anode plate 2—31 so that the currents passing through the main electron circuit correspond to an ampilfied signal. Between the cathode 2—25 and the anode 2—31 there is also provided an additional electrode 2—77 in the form of a screen which is also charged to a high potential with respect to the cathode 2—25, and facilitates the passage of the emitted electrons toward the anode. The screen grid 2—77 being closer to the cathode functions to maintain the average passage of electrons to the anode at a fairly constant and high value regardless of moderate changes of potential between the anode and the cathode. Accordingly, the fluctuations in plate voltage caused by the passage of fluctuating signal currents through it from the cathode to the output, and variations in output impedance presented by the transducer windings 2—65 to signals of different frequencies have substantially no effect on the amplifying action of stage 2—14 and the amplification is of exceptionally high quality. In the form of construction shown in Fig. 2, the screen grid tube 2—14 also includes a third grid 2—33 which is connected to the cathode and tends to suppress the passage of electrons to the screen grid 2—77 after they have moved close to the anode.

The common connection of the bias tube with the signal output 2—80 does not appreciably effect the high quality operation according to the invention, inasmuch as the by-passing condenser 2—24 in the bias output circuit is selected to provide the necessary low impedance only for the high frequency bias currents so that its impedance to the signal currents, which are of much lower frequency, is high enough to have substantially no effect on the signal output circuit regardless of the portion of the signal frequency range being amplified.

When signals are being recorded, provision is made for assuring that the recordings are being made on elements of the record track from which all previous signals have been obliterated. In the form of the invention shown in Fig. 2, high frequency currents are supplied to the windings 2—90 of an obliterating head as described above. The push-pull high frequency amplifier 2—21 has its inputs 2—78 and 2—79 connected to the oppositely phased outputs of the oscillator 2—23, and the amplified obliterating currents pass directly through the windings 2—90, as shown.

For reproducing recorded signals, the multi-blade switch 2—60 is set to the right-hand playback position. The blades 2—61 and 2—62 of the switch 2—60 accordingly, connect the transducing windings 2—65 to the input 2—70 of the first amplifying stage 2—11 and the output of this stage at 2—71 feeds the input 2—41 of the next playback amplification stage 2—12. A playback volume control 2—91 is shown as provided across the input 2—41. The output of this stage 2—12, as indicated at 2—42, is supplied through signals equalizing elements, which may include a tone control potentiometer 2—92, to the final reproducing amplifier tubes 2—15 through 2—18, through input lead 2—43 for operating the signal reproducer shown as loudspeaker 2—24. The final amplification stages 2—17, 2—18 of the reproducing amplifier are shown as operated in push-pull, a suitably inverted signal being derived from the output of preliminary amplifier 2—15, as shown at 2—44, and fed through stage 2—16 to produce a second push-pull input signal opposite in phase to that of the push-pull input signal taken from the amplifier 2—15.

In the form shown, the Record playback switch 2—60 has additional blades 2—63, 2—64. The blade 2—63 shunts out an equalizing network from the output of playback stage 2—12 when in the Record position, and also acts to ground the bias output when in the playback position. Blade 2—64 is inserted in the B+ supply line fed by the rectifier and only prepares a B+ feed for the bias assembly 2—20, obliterating amplifier 2—21 and the intensity level indicator 2—19 when the Record playback switch is set for recording.

The form of the invention shown in Fig. 2 also includes the reeling control members, which together with limit switches, control the application for transducing, or in a reverse direction for rewinding. The arrangement may also be used to reel the record track in a forward direction at high speed as when it is desired to rapidly bring a desired portion of the record track into position for transducing. Manual controls in the form of a set of push-button switches 2—50 to 2—54 are shown as arranged to complete the energizing circuits to the various motors as well as to cooperate to the establishment of some of the amplifying circuits.

When in the normal inoperative setting, the reeling stop button 2—51 is held in an inward actuated position in which its associated switch opens a supply circuit to the impelling motors from A. C. bus connectors 2—27 and 2—28. For initiating a transducing operation, a supply reel is suitably mounted, a record track threaded into place and anchored on a take-up reel, and the forward push button 2—54 actuated to the inwardly held operative position causing the Stop button 2—51 to be released and retracted. The stop switch connected with the Stop push button 2—51 is accordingly closed, but the impelling circuit is still held open by the forward limit member 2—29, a pair of its contacts indicated at 1 being normally held open by a bias tending to keep the forward limit member in the non-actuated position shown. A small amount of record track reeling is then produced by moving the Start push button 2—52, which is of the hold-down type and not interlatched with the other push buttons. A pair of contacts 1 associated with the Start push button and shunting the forward limit contacts 1, accordingly establish power feed through connector 2—35 to the drive and take-up motors 177, 176 by means of the operated closed switch of the Forward push button 2—54, the normally closed switch contacts 3 of the Reverse push button 2—53 and blade 2 of the non-operated reverse limit switch. A small amount of initial reeling is all that is required to cause the record track to move the forward limit switch to its operated position in which it maintains the power feed from connector 2—35. The Start push button 2—52 may then be released and permitted to retract to the non-operated position shown without stopping the record track reeling. As shown in the form of the invention of Fig. 2, the forward limit switch may also have an additional set of contacts 2 for holding an obliterating energizing circuit closed while the forward limit member is held in its operated position.

The forward reeling so established is only effective for playback operation with the record playback switch 2—60 suitably set, inasmuch as the B+ power to the bias assembly 2—20 obliterating amplifier 2—21 and intensity level indicator 2—19 is held open by the non-actuated Record push button 2—50. The playback transducing may be stopped by operating the Stop push button 2—51 to open the impelling circuit or by operating any of the other interlocked push buttons 2—50, 2—53 to permit retraction of the Forward push button 2—54 opening the energizing circuit for the capstan motor 177. This is sufficient to promptly stop record track movement inasmuch as the extremely low torque of the take-up motor 176 is insufficient to overcome the resistance to the record track movement offered by the record track guides. The reverse push button is however also arranged to open the take-up-motor impelling circuit at its switch contacts 3 to shorten the record stopping period when this button is operated.

If desired the forward push button may be provided with additional control circuits for opening all the formal drive circuits when this button is retracted.

Removal of the record play back switch 2—60 from the record position will also stop the playback operation although it will not stop the reeling. With the playback operation proceeding a recording cannot be made by merely moving the Record playback switch 2—60 to the record position inasmuch as the open contact pairs of the Record push button 2—50 keeps the transducing windings disconnected from the amplifier and prevents energization of the bias assembly and oscillator. When the record track is completely unreeled from the supply reel, the impelling will be automatically terminated by release of the forward limit member so that it returns to the non-operated position shown in which its contacts 1 open the impelling circuits.

For effecting a recording operation, the record track is brought to the proper threaded condition, as above, the Record playback switch 2—60 set in the record position shown, and both Record and Forward push buttons 2—50, 2—54 operated to their inward actuated position simultaneously. The simultaneous holding of both the Record and Forward push buttons in their inward operated position permits them to both be latched in place and to retain their associated switches in closed condition for establishing the proper recording circuits. Any difference in timing between the operation of the Record and Forward push buttons permits the later operated push button to unlatch the earlier operated one so that the apparatus can not be inadvertently set in condition for recording. This is important inasmuch as an otherwise unintentional conversion from a playback to a recording condition by accidental control operation will damage the recording on the reeled record track by the obliterating action of the obliterating coil 2—90 and/or the recording action of the transducer windings. After setting the push buttons into recording position, the transducing can be initiated by momentarily operating the Start push button 2—52 in the same manner as described above in connection with playback operation. The playback sequency may be terminated by operating the Stop push button 2—51, the Reverse push button 2—53, withdrawal of the record playback switch 2—60 from the record position, or retraction of the forward limit member 2—29 in a manner also similar to that described above.

The apparatus illustrated in Fig. 2 may also be arranged to rewind record tracks. To this end the record track reeled on a take-up reel is first mounted on the take-up motor drive, as indicated in connection with Fig. 1, and the outer end of the record track brought over and anchored to the supply reel in a path that brings it adjacent the reverse limit member 2—37. The rewind threading path may be arranged so that when the record track is impelled along it, it is also brought into operative engagement with the rewind limit member 2—37 to actuate it from the non-operated position shown in Fig. 2 to the operated position in which its associated switch blades 1, 2 shift their circuit connections from one set of contacts to another in the manner indicated. The rewinding is started by moving the Reverse push button 2—53 to the inward operated position followed by momentary actuation of the Start push button 2—52 in a manner analogous to that used for starting a transducing operation. Actuation of the Reverse push button 2—53 opens the take-up motor drive at its contacts 3 and prepares an energizing circuit for the supply motor 175 at its contacts 2. Another contact pair 1 may be provided, as shown, for grounding the playback amplifier output so that no signals are reproduced during the rewinding.

With the reverse limit member 2—37 and the Start push button 2—52 not actuated rewinding does not take place because the reeling power supply line 2—39 remains disconnected from blade 1 of the reverse limit switch. A second pair of contacts 2 associated with the Start push button 2—52 is used to momentarily complete the energizing circuit and begin record track reeling until the record track reeling forces cause the reverse limit member to be moved to the operated position.

A rewinding operation may be arranged to proceed at a speed much higher than transducing by the simple expedient of keeping the capstan drive out of engagement with the record track so that a supply motor 175 is permitted to attain a fairly high speed for rapidly rewinding a long recording.

The rewinding operation is terminated by the actuation of any of the push buttons 2—50, 2—51, 2—54, or the complete runout of the record track permitting the rewind limit member to return to the non-operated position shown.

The high speed of the rewinding introduces certain difficulties because of the inertia effects of the rapidly rotating reels. Accordingly, when the rewinding is to be interrupted before the record track is entirely rewound, it is important that braking forces be applied to the take-up reel so as to bring the reeling operation to a standstill without too much overrun. It is also important that any braking of the supply reel be held to a minimum for such interruption, since otherwise the rapidly moving take-up reel, which in some conditions is filled with the record track, may be in a position to continue to rotate faster than the supply reel can take-up unreeled record track, and large quantities of the record track may be thrown about.

On the other hand, when a reeling operation is terminated by a complete unreeling of the record track, the outer end of the rewound record track which is rotating at a fairly high speed on the supply reel, has a tendency to whip around under the influence of centrifugal force and may tear by repeated violent engagements with surrounding surfaces. This whipping can be prevented by application of braking forces to the supply reel. In the form of the invention shown in Fig. 2, necessary braking forces for stopping a rewind operation are applied by passing direct current through the windings of the motor engaging the reel to be braked. The supply and take-up motors 175, 176 which may be of the A. C. induction type similar to those used with phonograph turntables experience substantial braking forces when a direct current is passed through their windings. The required application of braking forces, as described above and shown in the figure, is supplied by a rectifier 2—44 fed by the A. C. impelling circuit 2—27, 2—28 and connected to opposed contacts of different blades of the reverse limit switch as shown. During a normal rewinding operation when the reverse limit switch is in the rewind operation the D. C. supply is connected through switch blade 2 of the reverse limit switch, but is not supplied to the motors because of the open switch 3 of the operated Reverse push button 2—53. When the rewinding is interrupted, as by operation of the Stop push button 2—51, the Reverse push button 2—53 is automatically unlatched and drawn to the non-operated position, shown, in which it closes its switch contacts 3 to supply the take-up reel 176 with the direct current. Similar application of braking forces takes place when the rewinding is interrupted by the operation of any of the other push buttons 2—50, 2—54.

When normal rewinding is completed and the reverse limit member 2—37 is retracted to the non-operated position shown, the D. C. is fed through blade 1 of the reverse limit switch through closed contacts 2 of the operated Reverse push button 2—53 to the supply motor 175.

A forward reeling at high speed may also be established by taking the outer end of a record track coiled on a supply reel, threading it in a path adjacent the forward limit member 2—29, and anchoring it directly to the take-up reel. The fast forward reeling path should keep the record track out of engagement with the capstan roller drive so that take-up motor, when energized, attains a speed much higher than that to which it is held against in transducing. The fast forward reeling is then started by moving the Forward push button 2—54 to its inward operated position and momentarily actuating the Start push button 2—52 in the same manner as indicated above in connection with a transducing or slow speed forward reeling operation. Braking action for terminating a high speed forward reeling may be provided by operating the Reverse push button 2—53 to its actuated position before the record track is completely unreeled from the supply reel. This operation opens the forward reeling energy supply circuit to take-up motor 176 at contacts 3 of the reverse switch and simultaneously establishes through its contacts 2 the D. C. braking current to the supply motor 175.

According to another form of operation of the invention shown in Fig. 2, the record track may be reeled while kept out of contact with the limit members 2—29, 2—37 so that the Start push button 2—52 must be held down to maintain the reeling. This technique is particularly useful for high speed reelings in either direction since the entire duration of such a reeling is of the order of one minute or less, and the momentum of the heavily loaded reels are such that the stopping manipulations should anticipate the cessation of reeling by an appreciable length of time in the order of ten seconds. Such high speed reeling without the limit members is easily controlled by holding the Start push button down and pushing the Forward or Reverse push buttons 2—54, 2—53, as desired. Operation of the Forward push button, for example, while the record track is rewinding at high speed will cause the application of forward impelling forces to the take-up reel and quickly stop the rewinding after which it will smoothly start a forward reeling, and vice versa.

According to a modification of the invention of Fig. 2, the D. C. braking current may be arranged to be fed to the supply or take-up motors 175, 176 in a manner opposite to that shown for the rewind braking so that forward reeling at high speed may be more simply effected. If desired, an additional Fast Forward push button may be provided for establishing the high speed forward reeling operation without energizing the capstan motor 177.

The reeling operations of the transducer shown in Figs. 1 and 2 may also be controlled by the application of braking forces directly to the reels. Thus, for example, during a high speed reeling the light pressing of a finger against a reel will develop sufficient resistance to overcome the low torque of the reeling motor and rapidly slow down and stop the reeling without injuring the finger. Furthermore during a slow speed transducing, the slowly moving take-up reel can be instantaneously stopped with the hand causing the capstan to disengage itself from the record track by impelling enough of the track to permit a small amount of slack to appear and permit the record track which is fairly limp to move out of contact with the rotating capstan. The reeling is thereby substantially instantaneously halted. The forward limit switches may also be arranged to open in response to this appearance of slack and deenergize the forward reeling drives so that the transducing remains interrupted until the Start push button is again momentarily operated.

In place of the three reeling motor 175, 176, 177 a modification of the invention may have a single motor used with three power take-offs connected through clutches to the reel rotating shafts and capstan roller. The clutches may be momentarily controlled from a suitable control unit, or the clutches may be of the magnetic type placed in coupling engagement by the passage of direct current.

An important feature of the invention, as shown in Fig. 2, is the application of substantial position biasing potential to the filaments used for indirectly heating the electron emitters of the low level amplifying stages. As shown, the power transformer windings 2—45, which may be utilized for operating all the tube filaments in parallel, is also connected by lead 2—46 to a source of positive potential 2—47, shown as a tap between voltage dropping resistors bridging the $B^+$ supply. The heater filaments, as shown at 2—48, for the lowest level amplifying stage 2—11 being connected with the heater windings 2—45 are accordingly maintained at a substantial positive potential with respect to cathode 2—49 of this stage. The function of this filament bias is to substantially saturate any leakage currents caused by electrons emitted from the cathode 2—49 and moving to the filament 2—48. In prior arrangements, this cathode to filament current corresponds to a random flow of electrons and introduces noises in the amplified signals because of the variations inherent in the random flow. By substantial saturation of the flow, in accordance with the invention, the noise injected at this stage is considerably reduced. The advantageous results of this feature are especially noticeable in record playback operations where the signals induced in the transducing windings 2—65 are of a very low intensity of the order of one or two millivolts. The heater windings of the other amplifying stages 2—12 through 2—18 may also have the same positive bias applied with respect to their cathodes. The amplifier performance, however, is only slightly improved by the biasing of the other filaments but it is convenient since it enables a single heater winding 2—45 to be used for all the tube filaments. In practical examples of filament biasing according to the invention, the bias may be of the order of 35 to 40 volts. In one form, with the preliminary amplification stage utilizing type 6SJ7 tube, a filament bias of 35 volts produces highly satisfactory results.

According to the invention, the magnetic transducing amplifiers include equalizing circuits for varying the gain of selected portions of the signal frequency range and thereby making possible the reproduction of signals having a desired relationship to the signals originally recorded. This is an important feature because the response characteristics of the usual magnetic record media are such that signals of different frequencies, even though recorded at substantially uniform intensity, are played back with different intensity levels and without equalization the entire apparatus would not function satisfactorily.

Fig. 3 is a curve diagram showing the characteristics of a typical magnetic record track. The curve 40, as given, is that for the bonded powder type disclosed in the copending Kornei application, Serial No. 685,092, filed July 20, 1946, now abandoned, in which finely divided magnetizable powder having particle size of the order of one micron or less are dispersed in a bonding compound as a coating layer adherently united to a supporting base. The coercive forces of the bonded stratum are about 120 oersteds, and its remanence about 500 gauss. The data of Fig. 3 was prepared by moving the record track with respect to a transducing head at the rate of eight inches per second, recording signals of varying frequencies and equal amplitude, and measuring the playback level of the different recorded signals. With other magnetic record track or with other relative track speeds, curve 40 might be shifted somewhat but would substantially retain its general shape. Thus, at higher speeds where the recorded signal flux is moved more rapidly past the playback head, the curve is shifted upwardly and to the right to higher output levels and improved high frequency response, but otherwise remains substantially identical. With record media having higher remanence the curve is shifted in a generally upward direction, and with media having higher coercive force the curve is shifted to regions of improved high frequency response.

According to the invention, the variation in playback levels is equalized by boosting the level of signals to be recorded in a low and a high frequency range as compared to the level of an intermediate range of frequency, as shown by curve 41 in Fig. 3, for example. This equalization is effected during playback, as shown by curve 42 in which a generally similar low and high frequency boost is provided as compared to an intermediate frequency.

One of the important advantages resulting from the equalization according to the invention is the fact that a relatively simple transducing amplifier can be used for both recording and playing back without requiring the enormous gain that would be necessary for bringing up the level of the low frequency response in a single equalizing step. It would be expected, however, that the preliminary boosting of signals to be recorded would produce distortion due to the saturation of the record track by the boosted signals, while the unboosted signals of intermediate frequencies would still have a level too low to approach record track saturation. Thus, when effective recordings are to be made, the recording level should be as high as possible and when the intermediate frequency level is at a maximum the boosted high and low ranges would be expected to be at a level above the maximum when the recorded flux is not directly proportional to the recording flux.

It has been discovered, however, that such distortion does not take place, and in fact the two-step equalization of the invention is extremely efficient and makes possible the reproduction of signals practically indistinguishable from the original signals recorded. This is due to the fact that in the ordinary speech and music class, signals show an average intensity distribution having a maximum level for signal frequencies of about 300 or 500 cycles with gradually diminishing intensity levels above and below this range. Thus, for example, above about 1000 cycles normal speech and music signals drop off fairly rapidly in intensity with rising frequencies, and similarly below about 200 cycles another sharp drop in intensity occurs.

Accordingly, even though a low and high frequency boost of 10 or 15 db is effected on signals to be recorded, no trace of saturation distortion appears.

In the form of the invention shown in Fig. 2, equalization is produced by the following arrangement:

During recording, the serial network of condenser 2—55 and resistor 2—56 shunts off some of the high frequency output of recording amplifier 2—13 producing a low frequency boost corresponding to portion A of curve 41 as compared with the intermediate range in parallel in Fig. 3. The network of condenser 2—58 and resistor 2—57 blocks some of the low frequency output of the same amplifier providing a high frequency boost corresponding to portion C of curve 41. During playback the network formed by condenser 2—59 in parallel with the transducer windings is tuned to a resonance point which provides the high frequency boost corresponding to portion C of curve 42 of Fig. 3. The series network formed by condenser 2—67 and resistor 2—68 shunts off some of the output of playback amplifier 2—12 providing a boost shown in portion B of curve 42. The network formed by the parallel condenser 2—67 and the series resistor 2—69 acts to level off the low frequency playback boost to provide the portion A of playback curve 42.

The boosted portion C of the playback curve 42 is arranged by merely selecting a condenser 2—59 so that it causes the transducer windings to resonate to a frequency higher than the highest frequency intended to be faithfully transduced. For example, where the desired high fidelity is in a range below 5000 cycles, the resonant frequency may be adjusted to 6000 cycles. The condenser-resistor networks are merely selected to provide a time constant, such that a desired range of frequencies is either shunted or blocked.

To enable others in the art to make and construct a record transducer having the equalization described above, and without in any way limiting the invention the following data for a practical example is given:

| | | |
|---|---|---|
| Resonant frequency of the transducer windings and parallel | | |
| condenser 2—59 | cycles | 6000 |
| condenser 2—55 | microfarads | .05 |
| resistor 2—56 | ohms | 8200 |
| resistor 2—57 | do | 33,000 |
| condenser 2—58 | microfarads | .0025 |
| condenser 2—67 | do | .002 |
| resistor 2—68 | ohms | 1,000,000 |
| resistor 2—69 | do | 220,000 |

The above constants provide a substantially level playback response from about 50 to about 5000 cycles, in which the portions A of curves 41, 42 extend up to about 200 cycles, portions B from about 200 to about 1000 cycles, and portions C from about 1000 to about 5000 cycles. The above circuits are used with record track having a bonded stratum of finely divided magnetic oxide particles moving at a rate of about eight inches per second. The recording current is adjusted to about 0.3 milliampere and the bias current at a frequency of 30 kilocycles is adjusted to two milliamperes. The amplifying tubes used in the above amplifier are of the following types:

| | |
|---|---|
| Tube 2—11 | 6SJ7 |
| Tube 2—12 | half of a 6SN7 |
| Tube 2—13 | half of a 6SN7 |
| Tube 2—14 | 6SJ7 |
| Tube 2—15 | half of a 6SL7 |
| Tube 2—16 | half of a 6SL7 |
| Tube 2—17 | half of a 6SN7 |
| Tube 2—18 | half of a 6SN7 |

The B+ power supplied to the tubes 2—11 through 2—14 is about 280 volts.

The apparatus may also be provided with a separate input 2—81 for directly receiving signals in the form of electric currents. These may be connected to any convenient D. C. output, such as the detector output of a conventional radio. In this manner high fidelity recordings of radio programs can be made from practically all radios even including the inexpensive and compact ones which ordinarily introduce an appreciable amount of distortion in their audio-amplification system, but which uniformly have a fairly good response from the radio frequency stages and the detector. A small condenser 2—82 is shunted across the amplifier input from lead 2—81 to lower the impedance of the input radio frequencies and of the bias frequency, thereby eliminating any tendency for picking up spurious radio signals or for the biasing signals to be induced and fed back into the amplifier to cause oscillation.

In order to be able to listen to and monitor non-audible electrical signals that are being directly recorded from a source such as a recording the playback volume control 2—91 only has to be turned up to provide the desired intensity in the signal reproducer 2—24. At the same time, the blade 2—63 of record playback switch shunts out the equalizing condenser 2—67 so that the monitor signals reproduced at the loudspeaker 2—24 experiences none of the equalizing boosts and is a faithful reproduction of the signals at the input 2—81.

Another important feature of the present invention is the feeding of the intensity level indicator input from the screen grid of the screen grid amplifier 2—14. For most reliable operation, the level indicator should be responsive to the signal as finally amplified and supplied to the transducer windings. In this manner, the intensity level indications are completely unaffected by variations in amplifier characteristics such as may be produced by drift or tolerance variations of the circuit capacitance or resistance values and the normal tube variations associated with the useful life of a vacuum tube.

For simplified rugged and inexpensive construction however the final amplified output fed to the transducer windings is mixed with bias currents and as indicated above the plate currents of the final amplifier tube 2—14 and the bias output tube are passed directly through the recording windings. The bias currents are normally greater than the amplified signal currents in the windings and are generally of constant amplitude and about ten times the maximum signal current amplitude. Accordingly, to provide suitable monitoring or intensity level indicators an additional signal output should be provided, so that it is unnecessary to use complicated networks for taking the indicator input from the biased signal and carefully filtering out the bias currents. Furthermore, such filtering would unnecessarily load the record signal output.

According to the invention, advantage is taken of the fact that the screen grid voltage of a screen grid amplifier exhibits signal variations if it is not securely held at constant potential by a large low impedance capacitance conventionally tying it to the cathode or ground.

In the form shown in Fig. 2, the screen capacitor 2—89 is selected so as to permit signal voltages to appear across a screen return resistor 2—88. The capacitance of condenser 2—89 may also be arranged to provide a low impedance shunting path for preventing the appearance of high frequency bias voltages at this point and to simultaneously minimize the degeneration that would otherwise accompany the floating of the screen grid. The gain of tube 2—14 is accordingly kept at a high level and the input, 2—76 of the intensity level indicator may be directly connected to the screen grid 2—77 through a bypass condenser as shown.

With a type 6SJ7 tube used in the final recording amplifier stage with a B+ supply of about 280 volts, a highly effective monitor and/or intensity-level output substantially free of bias is provided from a screen return resistor 2—88 of 27,000 ohms with a screen shunting capacitor of 0.02 microfarad.

As indicated, the secondary output from screen grid 2—77 may be used for supplying a monitoring amplifier to provide audible signals for use when non-audible signals are supplied to the recorder input 2—81 or 2—66. Such monitor feed may supplement or replace the level indicator feed if desired. The construction diagrammatically illustrated in Fig. 2 has been in commercial production under the trade name "Soundmirror" and has achieved quite a measure of popularity.

Fig. 2–A shows a portion of the transducing arrangement of Fig. 2 in modified form and embodying additional features of the invention.

As shown, the playback amplification and early recording stages may be of any suitable type such as that shown in Fig. 2. The final recording amplification, signal biasing, oscillating, erasing and monitoring operations have the following features:

The final recording stage 3—14 is connected and operated as a conventional amplifier except that the oscillator coil 3—41 is placed in series in the plate supply to its plate resistor 3—42. The oscillator stage 3—23 receives its plate supply through the oscillator coil 3—41 so that its output is automatically mixed with the output of stage 3—14.

The oscillator itself is of a modified Colpitts type operating with grounded grid and two series-connected tuned circuit condensers 3—01, 3—02 providing a cathode feedback connection at their junction. The condensers 3—10, 3—02 provide the tuned circuit capacitance by being connected in parallel with the oscillator coil 3—41. In accordance with one phase of the invention, however, the capacitance return is to a B+ lead different from the one supplying the amplifier 3—21. This feature provides a simple oscillator control arrangement for automatically stopping oscillations when the apparatus is set for playback without requiring any special oscillator control switches. The avoidance of bias oscillations when playing back a recording enables simpler design and construction of the playback amplifiers and makes it unnecessary to carefully shield them from the easily radiated high frequency bias fields which have a higher intensity than the playback signals fed into the amplifiers from the pick-up head. In the form shown in Fig. 2-A a recording monitor stage 3—19 and an erasing current output stage 3—20 directly connected to the windings 3—65 of the erasing core 3—90 and fed by the oscillator through coupling condenser 3—78 are both arranged to be deactivated during playback as by opening their B+ supply circuit in a manner such as indicated in the construction of Fig. 2, for example. By having the tuned circuit of the oscillator 3—23 completed through the B+ supply leads to the monitor 3—19 and erasing output amplifier 3—20, the oscillator is automatically deactivated during playback. At the same time when recording, the oscillator output is automatically mixed with the signals amplified in the final recording stage 3—14 without requiring an additional coupling condenser or switch. Bias currents are fed from the plate of oscillator 3—23 through the plate resistor 3—42 of amplifier 3—14 and to the recording head and loading resistor 3—92 along with the signal currents via coupling condenser 3—26.

The erasing current amplifier 3—20 is shown as directly connected to the two windings 3—65, 3—65 of the erasing core 3—90, the winding being in the plate and cathode circuits respectively. This construction provides a simple erasing current amplifier and feed using a minimum number of components especially condensers. A small condenser 3—70 connecting the plate and grid of the amplifier is all that is necessary to obtain high quality operation.

The record signal monitoring arrangement of Fig. 2-A is also modified, the electron ray tube 3—19 which may be similar to that of Fig. 2, being fed a substantially ripple-free voltage corresponding to the intensity of the signals being recorded. The monitor indications are accordingly clear, sharp and easily understood by the layman. As shown, the input of the record amplifier stage 3—14 is also connected to the input 3—79 of an additional amplifier stage 3—21 and the output of this stage 3—21 is passed through diode-operated rectifier 3—22. The negative half-waves of the signal currents are filtered in the network formed by series resistor 3—80 and parallel capacitor 3—81 having a time constant such as to provide monitor input with the desired smooth D. C. voltage exhibiting essentially only those variations corresponding to changes in signal intensity rather than the cyclical signal oscillations.

It is understood that the different features of the arrangement of Fig. 2 may be used independently without any one or all of the other features, or may be combined with one or more of the others as desired. Thus, for example, simplified constructions may entirely omit the amplifying rectifying and filtering stages of the monitor supply. The monitor used may then be of the type shown in Fig. 2 or may merely be a gas discharge glow lamp such as a neon bulb fed by a suitably amplified bias-free signal. Additionally, other oscillator arrangements may be used in the apparatus if the simplified switching is not desired, as by merely returning the connection of condenser 3—92 to ground instead of to the switched B+ line.

Without in any way limiting the invention, and in order to enable others skilled in the art to construct a practical form of the invention shown in Fig. 2-A the following typical values are given:

| | |
|---|---|
| Tube 3-14 | type 6J7 |
| Tube 3-19 | type 6E5 |
| Tube 3-23 | one-half of type 6SN7-GT |
| Tube 3-20 | one-half of type 6SN7-GT |
| Tube 3-21 | one-half of type 6SN7-GT |
| Tube 3-22 | one-half of type 6SN7-GT |
| Oscillator coil 3-41 | 30 millihenries |
| Resistor 3-42 | 33,000 ohms |
| Coupling condenser 3-26 | .1 microfarad |
| Recording head loading resistor 3-92 | 1,000,000 ohms |
| 6J7 cathode resistor | 270 ohms |
| Screen supply resistor | 33,000 ohms |
| Screen loading resistor | 27,000 ohms |
| Screen by-pass condenser | .005 microfarad |
| Condenser 3-01 | .001 microfarad |
| Condenser 3-02 | .005 microfarad |
| Cathode resistor of oscillator 3-23 | 8,200 ohms |
| Condenser 3-70 | .001 microfarad |
| Coupling condenser 3-78 | .0001 microfarad |
| Cathode resistor of amplifier 3-21 | 1,000 ohms |
| Plate resistor of amplifier 3-21 | 100,000 ohms |
| Input coupling condenser for rectifier 3-22 | .002 microfarad |
| Output by-pass condenser of amplifier 3-21 | .002 microfarad |
| Resistor 3-80 | 1,000,000 ohms |
| Condenser 3-81 | .05 microfarad |
| Output loading resistor of rectifier 3-22 | 1,000,000 ohms |

Fig. 3-A is a modified equalizing network which provides slightly better results and may be directly substituted for the corresponding network in the output of the second playback amplification stage 2—12. As shown, the output of this stage is supplied to two resistors 3—69 and 3—68 in series, and a series network of resistor 3—51, reesistor 3—52 and condenser 3—53 are connected across resistor 3—68. A tap 3—55 from the connection between resistors 3—51, 3—52 is connected to a grounding switch for inactivating the equalization during a recording operation in a manner similar to that described in connection with Fig. 2. Additionally, the values of the resistors are selected for suitably diminishing the signal level when the tap 3—55 is grounded so that succeeding playback stages beginning with stage 2—15 will reproduce a signal which is not equalized or otherwise distorted, and which is of a lower intensity adequate for monitoring any recording being made. Signal take off from the equalizing network of Fig. 3-A is taken from the junction between resistors 3—69, 3—68 and may include a tone control, such as the adjustable resistor 3—73 and series condenser 3—74.

Without in any way limiting the invention, and in order to enable experts in the art to construct the same one example of practical values of the various elements of the equalizing circuit of Fig. 3-A is:

| | | |
|---|---|---|
| Resistor 3—69 | ohms | 100,000 |
| Resistor 3—68 | do | 1,000,000 |
| Resistor 3—51 | do | 8200 |
| Resistor 3—52 | do | 27,000 |
| Condenser 3—53 | microfarad | .01 |
| Potentiometer 3—73 | ohms | 1,000,000 |
| Condenser 3—74 | microfarad | .0005 |

Fig. 4 shows another form of magnetic transducer circuit according to the invention. In this modification all the necessary electrical parts are placed in extremely compact and simplified form and is operated by a single record playback multi-blade switch 4—60 together with a simple On-Off switch 4—34.

The amplifier includes a set of amplification stages 4—11, 4—12, 4—13, 4—14, and 4—15 for amplifying the signals during recording or playback. When the record playback multi-blade switch 4—60 is set into the record position, one of its blades 4—61 connects a microphone jack 4—66 with the input 4—70 of the first amplifying stage 4—11, the output of which at 4—71 feeds the input of the second amplified stage 4—12. A volume control 4—91 is shown as provided across the input of the second amplifying stage. The output 4—80 of the second amplifying stage 4—12 is directly connected to transducer windings 4—65 of transducer head 4—95 through a second blade 4—62 of the multiblade record playback switch. The common ground completing the connections is shown at 4—10. During the recording a bias oscillator 4—23 including coil 4—41 and feedback condensers 4—01, 4—02 provides the desired biasing currents which are superimposed on the amplified signal currents by the feed connection from the oscillator coil 4—41 through an amplifier plate-resistance-bridging condenser 4—24.

If desired, an additional amplification stage 4—22, having its input connected to the oscillator output at 4—78, may be provided, as shown, for amplifying part of the output of oscillator 4—23 to produce high frequency currents strong enough to be fed through the windings of an obliterating core to prepare the record track for erasing in a manner similar to that shown in Fig. 2-A. The obliterating amplifier 4—22 may have the obliterating winding, 4—87, 4—88 of a magnetic obliterating core 4—90 in the plate supply and/or in the cathode return, as shown. The obliterating core may have its two windings 4—87, 4—88 of substantially identical characteristics and connected together in series around the individual pole pieces of a core generally similar to the transducer core 4—95. In this form of the invention the amplified bias currents are passed directly through the magnetic core windings with a minimum of component parts required in the construction.

According to modified forms of the invention, the obliterating windings 4—87, 4—88 may be both connected in only the plate or cathode circuit. The two windings may be interconnected in series or in multiple to provide the necessary loading.

The apparatus of Fig. 4 may also be used with a simplified form of transducer in which obliteration is effected by magnets which require no amplifier supply. This is especially desirable with compact transducers where the number of tubes is to be held down to a minimum. The amplifier tube 4—22 together with all its connections may be omitted in this form of the invention, and the magnets may be of the permanent magnet type which are inexpensive to produce and require no electrical connections or windings. The obliterating magnets may be shaped and disposed so that the record track is moved through a succession of reversed magnetic fields of gradually diminishing intensity. The first obliterating field to which the record track is exposed may be of an intensity high enough to insure saturation of the elemental portions of the record track after which the alternating and weaker magnetic fields provide a number of decaying cycles which leave the elements of the record track in a substantially demagnetized condition. One suitable type of such a permanent magnet obliterating head is shown in the copending Begun application, Serial No. 753,328, filed June 7, 1947. Although about three cycles of such decaying alternations insure a substantially complete demagnetization, only about two cycles or three alternations, such as may be provided by two properly placed magnets, are sufficient to bring the elements of the record track into a pseudo-demagnetized condition in which they provide excellent signal transducings. As explained in the above identified Begun application, Serial No. 753,328, the highly effective operation of the transducer with a pseudo-demagnetized record track is probably due to the effect of the biasing currents, the high frequency alternations of which not only collapse the hysteresis loop of the elements of the record track, but cause them to receive recordings in a manner not distinguishable from actually demagnetized elements.

In the form of the invention shown in Fig. 4, monitoring is provided by an additional blade 4—63 of the record playback switch 4—60 which supplies signal currents to the input 4—43 of playback amplifier 4—13. The monitoring signal is taken through condenser 4—20 from the screen grid 4—77 of the amplifier tube associated with the final recording amplifier stage 4—12. Amplifiers 4—14 and 4—15 are arranged to receive a signal from the output 4—44 of playback amplifier 4—13 and to act in push-pull amplification to provide the final playback amplification of the signals for reproduction in the signal reproducer 4—24.

Push-pull amplification by stages 4—14 and 4—15 is arranged in the form shown by operating amplifier 4—14 in the standard manner using a cathode resistor 4—89 which is not by-passed and feeding the second amplifier 4—15 from the signals developed across the cathode resistor. As shown, the input connections to amplifier 4—15 must be properly arranged to obtain an amplified output opposite in phase to the output of amplifier 4—14. The combined outputs of the final playback amplifiers are fed to the primary windings of output transformer 4—93 in conventional push-pull manner. The secondary windings 4—94 of the output transformer supply the signal reproducer 4—24 through a circuit including serially connected switch contacts 4—95 associated with the microphone input jack 4—66 as well as a manually operable switch 4—96.

Inasmuch as use of the transducing apparatus to record signals from a microphone, used within earshot of the operator, do not require monitoring, the switch 4—95 may be arranged for being automatically opened when a microphone plug is inserted in the jack 2—66 in the manner indicated. The jack 4—66 is provided with a movable contact 4—96 arranged to open input contact 4—97, and mechanically linked at 4—98 with contacts 4—95 so as to also open the signal reproducing circuit from the transformer output windings 4—94. Contacts 4—97 are placed in the circuit of an additional input 4—99 which may be used for directly supplying electrical signals, such as radio or phonograph programs, in the manner described above in connection with Fig. 2.

Switch 4—96 may be provided for disconnecting the monitor output when desired. In the form shown, the switch may be mechanically linked with a potentiometer 4—92 of a tone control connected across the input of amplifier 4—13.

As a further modification of the invention, the monitor control contacts 4—95 may be omitted and the signal output circuit completed directly to ground through switch 4—96 so that the apparatus may be used to amplify any input signals and may be arranged as a public address amplifier with microphone input, as in the assembly shown in Fig. 2.

The signal intensity level indicator of the simple glow-lamp type is shown in Fig. 4 for enabling the operator to control the level of signals being recorded, as by operation of the volume control 4—91. According to the instant form of the invention a glow discharge lamp 4—19 is connected across the output of the final push-pull playback amplifying stages 4—14, 4—15 in series with a resistor 4—76. The resistance value of the series resistor 4—76 may be selected at that which will cause signals of excessively high level to discharge through the glow lamp 4—19 emitting light and indicating to the operator that the signals passing to the transducer windings 4—65 are too strong and that the volume control 4—91 must be adjusted to diminish the amplification gain.

In playback operations the record playback switch 4—60 is set to the playback position in which it is shown in Fig. 4, whereupon the transducer windings are connected through switch blades 4—62 and 4—61 to the input of amplifier 4—11 and to the equalizing condenser 4—59. At the same time, switch blade 4—63 connects the output 4—80 of the final recording amplifier 4—12 directly to the tone controlled input 4—43 of playback amplifier 4—13. The tone control across this input is arranged to apply a relatively large load to this output which through condenser 4—24 is also applied to the output of oscillator 4—23. Oscillation is thereby prevented and no biasing currents are developed. The switch blade 4—63 of the recording playback switch, when in playback position, also supplies the playback amplifiers 4—13, 4—14, 4—15 with the entire amplified signal output of amplifiers 4—11, and 4—12 from the output 4—80 so that all the amplification stages function during playback.

The tone control across the input 4—43 is effective during playback for suitably adjusting the levels of the various signal frequencies being reproduced to provide a variation between the original and the reproduced signals, if desired. During the recording the tone control may also be used to modify the monitor signals, but has no effect on the signals being recorded.

Signal equalization to compensate for the effect of the magnetic recording medium is provided in the form of the invention shown in Fig. 4 by various networks as follows:

Condenser 4—55 and resistor 4—56 serially connected across the amplified output of preliminary amplifier 4—11 acts to boost the low frequencies during recording and playback. This boost may be of the form shown in Fig. 4 in which the recording amplifier gain is shown at 4—41, and the recording gain is shown at 4—42 as a function of the signal frequency. Portions D of these curves show the low frequency boost contributed by the network 4—55, 4—56. The overall boost required to level the low frequency end of the magnetic record track response curve 40 may be divided into two substantially equal portions so that the same boost used first during recording and then during the playback gives the desired equalization. The high frequency boost indicated at portion E of the playback curve of 4—42 is contributed by the resonant action of condenser 4—59 which is connected across the transducer windings during playback. For suitable monitoring operations, the screen by-passing condenser 4—67 together with the parallel resistor 4—68 connected to the ground from screen 4—77 of the final recording amplifier 4—12 are adjusted in value for boosting the high frequencies of the signals fed through the monitoring condenser 4—20 so that the monitor signals are substantially faithful reproductions of the signals to be recorded.

Without in any way limiting the scope and only in order to facilitate practice of the invention, there are given below data for one practical embodiment of the form of the invention shown in Fig. 4:

| | |
|---|---|
| Tube 4–11 | type 6SJ7 |
| Tube 4–12 | type 6SJ7 |
| Tube 4–23 | half of a type 6SL7 |
| Tube 4–13 | half of a type 6SL7 |
| Tube 4–14 | half of a type 6SN7 |
| Tube 4–15 | half of a type 6SN7 |
| B+ supplied by the rectifier about | 300 volts |
| Tone control potentiometer 4–92 | 5000 ohms |
| Tone control condenser | 0.1 microfarad |
| Condenser 4–55 | .005 microfarad |
| Resistor 4–56 | 220,000 ohms |
| Condenser 4–24 | .0005 microfarad |
| Condenser 4–67 | .005 microfarad |
| Resistor 4–68 | 68,000 ohms |
| Condenser 4–59 tunes transducer windings to | 6000 cycles per second |

The above practical embodiment of the construction of Fig. 4 was incorporated in a magnetic transducer having mechanical reeling controls of the general type described in the copending Williams application, Serial No. 732,970, filed March 7, 1947. Oblieration was effected with the permanent magnet type obliterating head described above.

The level of playback response of the transducer of the type shown in Fig. 4 may be increased, if desired, especially in the form of the invention shown in which an additional biasing amplifier is used to provide the erasing currents. A single additional amplifying tube may be added in the form of half of a multi-element tube of the general types described in the practical embodiment having several independent space discharge arrangements contained in a single tube envelope. The additional playback amplifier may be incorporated with the oscillator amplifier in a single tube envelope so that a total of only 5 tubes will provide the biasing as well as all the necessary recording and playback amplification required. In the simplified modification of Fig. 4 in which no bias amplifier is employed a total of only 4 tubes provides all the amplification and biasing functions.

The instant invention includes another signal equalizing constructional feature. According to this phase of the invention the signal equalization is arranged not only to boost the high frequency range of the recording current but to cut down this current above the highest desired frequency. This technique eliminates practically all difficulties hitherto experienced because of the interference of the electric and magnetic fields radiated by these high frequency currents and the more careful shielding and stage decoupling required.

The apparatus of Fig. 4 may be conveniently operated in this manner by merely selecting the capacitances of condenser 4—24 and coupling condenser in output head 4—80 so that they form a parallel resonant circuit with the transducing head windings tuned at or a little above the desired high frequency limit, and at the same time the capacitance of condenser 4—24 forms a series resonant circuit with the oscillator coil 4—41 tuned to a frequency above the resonant frequency of the parallel-resonant circuit. Condenser 4—24 has one terminal connected to the ungrounded end of the transducer windings through output lead 4—80 when the switch 4—60 is in record position. The other terminal of condenser 4—24 is connected to the grounded end of the transducer windings through the oscillator circuit including the feedback condensers 4—01, 4—02 and the coil 4—41 and plate supply filtering capacitance. The oscillator coil 4—41 provides only a small impedance to signal currents at the high frequency limit which may be of the order of 5000 cycles per second as compared to the bias frequency which may be of the order of 30,000 cycles per second and the B+ filtering capacitance is of substantially zero impedance so that considered as a whole the positive or upper end of condenser 4—24 is substantially at ground potential with respect to the high frequency signals. Additionally since the reactance in the output lead 4—80 may be selected to have a value much lower than that of condenser 4—24, this condenser alone may be considered to form the capacitance arm of the parallel resonant circuit.

Figure 5A:
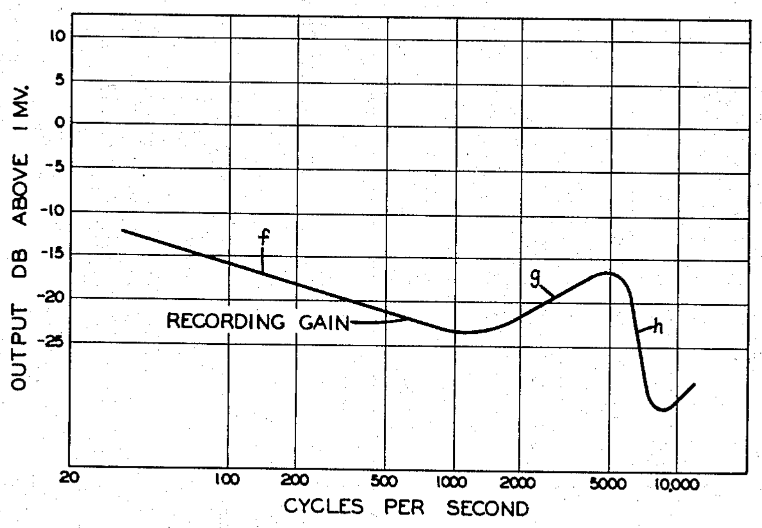

Fig. 5A shows a typical recording current equalization and cut-off curve according to the invention. Portion *f* of this curve shows the low frequency recording boost as shown in Fig. 5. At *g* is represented the high frequency boost due to the resonant action between condenser 4—24 and the transducing windings, peaking at a first frequency slightly above 5000 cycles per second. The series resonance between condenser 4—24 and coil 4—41 effectively loads the output of amplifier 4—12 at a second resonant frequency of about 8000 cycles per second. The series resonant loading is only slight at the first resonant frequency but it increases very rapidly with rising frequency because the series resonant circuit can be given a higher Q or peaking ratio due to the fewer number of components connected to it.

In this manner not only is the amplifier design simplified but part or all of the high frequency equalization can be supplied by proper selection of capacitor 4—24 so that the capacitor 4—59 need not assume the entire burden and its capacitance may be diminished or it may be entirely eliminated.

Fig. 6 shows a further modification of the invention in which the number of components is trimmed down even further to provide an extremely inexpensive construction. This embodiment of the invention may be used with a signal reproducer in the form of a pair of earphones and only three playback amplification stages provide more than enough gain for this purpose.

Four vacuum tube stages 8—21 to 8—24 are shown as energized through a conventional 110 volt A. C. supply line, switch 8—10 and power transformer 8—36. Rectifier 8—31 and filter network 8—32 supply the B+ power for the vacuum tube operation and interconnect the four stages with the windings of a transducer core 8—40 and an electro-acoustic signal transducer through the Record-Playback switch 8—15.

As shown, the transducing control switch 8—15 is set for a playback operation and the On-Off switch 8—10 is closed, supplying power to the record track impelling motor 8—50 and to the amplifying stages 8—21, 8—22, and 8—23. Signals picked up by magnetic head 8—40 are applied to the grid of the first amplifying stage 8—21 through blade 3 of switch 8—15 without requiring a separate grid return circuit such as is commonly offered by a grid leak resistor.

The signal is amplified, fed through by-pass condenser 8—51 to the grid resistor 8—54 connected as the input of the second amplifying stage 8—22 where it is further amplified and fed through by-pass condenser 8—52 to the third stage 8—23 having an input grid resistor 8—55. The output of the third stage is connected through by-pass condenser 8—53 and volume control potentiometer 8—60 to the acoustic transducer 8—12 by means of blade 1 of switch 8—15 and a pair of the contacts of the jack 8—62 and the plug 8—64. The acoustic transducer as so operated, acts as a signal reproducer to translate the amplified electrical signal feed to corresponding sound signals. The second amplifying stage 8—22 is operated without bias thereby simplifying the construction. The potentiometer 8—60 and the switch 8—10 may be mounted for operation by a common control as shown.

For recording, the switch 8—15 is set to the extreme righthand position in which the vacuum tube stage 8—24 connected as a bias oscillator is energized through blade 4 while signals from the acoustic transducer 8—12 now acting to supply electrical signal currents corresponding to impressed sounds are fed by means of blade 1 to the input of the second amplifying stage 8—22, thence through the third amplifying stage 8—23 and blade 3 of the Record-Playback switch to the magnetic head 8—40, where a bias is supplied from the output of oscillator 8—24 by way of the capacitor 8—44. At the same time the first amplifying stage which is not used for recording has its input grounded by blade 2 of switch 8—50 to decrease the noise level. The oscillator 8—24 includes feed back condensers 8—75, 8—76 resonating with oscillator plate coil 8—59 at the desired biasing frequency.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for transducing signals by magnetic flux interlinkage between windings of a magnetic transducer core and successive elements of an elongated permanently magnetizable magnetic record track, an amplifying structure comprising: amplifying elements providing a number of amplifying stages for signal amplifications during recording and playback, all said number of stages being used for playback and less than all said number being used for recording, the output stage of the recording amplifier elements including a vacuum tube having an electron source for emitting electrons, an anode for collecting the electrons emitted from the source to form a main circuit through which said collected electrons are directed, a control electrode connected to a source of signals to be amplified for modulating the passage of electrons from said source to the anode and producing amplified signal currents in said main circuit, and a screen electrode placed between the electron source and the anode for helping to maintain the passage of large quantities of electrons from said source to said anode in spite of decreases in anode potential; said output stage having a main signal output supplied by a connection to said anode and a secondary output supplied by a connection to said screen electrode for further amplification to provide monitor signals to indicate the progress of the recording.

2. A magnetic record transducing apparatus as defined by claim 1 in which the monitor signals include an audible signal for indicating the nature of the recordings made by nonaudible signal.

3. A magnetic record transducing apparatus as defined by claim 1 in which the monitor signals include a visual signal for indicating the intensity level at which recordings are being made.

THOMAS E. LYNCH.

References Cited in the file of this patent

UNITED STATES PATENTS

| Number | Name | Date |
|---|---|---|
| 1,640,881 | Carlson | Aug. 30, 1927 |
| 1,725,709 | Geiger | Aug. 20, 1929 |
| 1,866,679 | Slepron | July 12, 1932 |
| 2,072,708 | Case | Mar. 2, 1937 |
| 2,199,189 | Scheldorf | Apr. 30, 1940 |
| 2,235,132 | Woodridge | Mar. 18, 1941 |
| 2,238,259 | Hagen | Apr. 15, 1941 |
| 2,247,775 | Gardener | July 1, 1941 |
| 2,268,872 | Hewlett | Jan. 6, 1942 |
| 2,282,870 | Lundie | May 12, 1942 |
| 2,315,848 | Geohegon | Apr. 6, 1943 |
| 2,351,005 | Camras | June 13, 1944 |
| 2,351,011 | Camras | June 13, 1944 |
| 2,386,892 | Hadfield | Oct. 16, 1945 |
| 2,394,196 | Morgon | Feb. 5, 1946 |
| 2,411,484 | Camras | Dec. 3, 1946 |
| 2,418,541 | Camras | Apr. 8, 1947 |
| 2,434,939 | Levy | Jan. 27, 1948 |
| 2,439,245 | Dunn | Apr. 6, 1948 |
| 2,449,291 | Gay | Sept. 14, 1948 |
| 2,466,514 | Vagtborg | Apr. 5, 1949 |
| 2,531,141 | Lootens | Nov. 21, 1950 |

FOREIGN PATENTS

| Number | Country | Date |
|---|---|---|
| 882,888 | France | Mar. 8, 1943 |

OTHER REFERENCES

R. C. A. Manual, 1940, pages 36 and 37.